(12) United States Patent
Schafer

(10) Patent No.: US 7,178,249 B2
(45) Date of Patent: Feb. 20, 2007

(54) MEASURING TOOL AND METHOD OF MAKING

(76) Inventor: Randal D. Schafer, deceased, late of Burlington, WA (US); by Margaret D. Schafer, legal representative, c/o Rulersmith, Inc. P.O. Box 263, Burlington, WA (US) 38233

( * ) Notice: Subject to any disclaimer, the term of this patent is extended or adjusted under 35 U.S.C. 154(b) by 0 days.

(21) Appl. No.: 11/283,542

(22) Filed: Nov. 17, 2005

(65) Prior Publication Data

US 2006/0130344 A1 Jun. 22, 2006

Related U.S. Application Data

(63) Continuation of application No. 11/035,622, filed on Jan. 13, 2005, now abandoned, which is a continuation of application No. 10/015,323, filed on Dec. 13, 2001, now Pat. No. 6,854,189.

(51) Int. Cl.
*B43L 7/00* (2006.01)

(52) U.S. Cl. .............................. 33/1 B; 33/489; 33/562

(58) Field of Classification Search ................. 33/1 B, 33/562, 563, 564, 566, 483, 484, 489
See application file for complete search history.

(56) References Cited

U.S. PATENT DOCUMENTS

| | | | |
|---|---|---|---|
| 317,188 A | 5/1885 | Pederson | 33/483 |
| 864,396 A | 8/1907 | Weston | 33/489 |
| 935,120 A | 9/1909 | Lucas | 33/489 |
| 1,007,290 A | 10/1911 | Jewell | 33/484 |
| 1,343,968 A | 6/1920 | Hahn | 33/489 |
| 2,246,491 A | 6/1941 | Abell | 33/489 |
| 2,522,908 A | 9/1950 | Szabo | 33/489 |
| 3,270,715 A | 9/1966 | Dreher | 451/445 |
| 3,738,010 A | 6/1973 | Carder | 33/489 |
| 4,053,986 A | 10/1977 | Axelrod | 33/17 R |
| 4,490,921 A | 1/1985 | Woods et al. | 33/476 |
| 4,559,705 A | 12/1985 | Hodge et al. | 33/1 B |
| 4,749,222 A * | 6/1988 | Idland | 296/152 |
| 4,779,346 A | 10/1988 | Schafer | 33/1 B |
| 4,875,667 A | 10/1989 | Schafer | 269/91 |
| 5,105,551 A | 4/1992 | McCutchen et al. | 33/563 |
| 5,191,716 A | 3/1993 | Anderson | 33/483 |
| 5,471,749 A | 12/1995 | Brady | 33/484 |
| 5,471,755 A | 12/1995 | Haskell | 33/485 |
| 5,557,996 A | 9/1996 | Reber et al. | 83/56 |
| 5,673,490 A | 10/1997 | Hill | 33/1 G |
| 5,819,422 A | 10/1998 | Schafer | 33/1 B |
| 5,829,150 A | 11/1998 | McEligot | 33/562 |
| 5,838,422 A | 11/1998 | Caskey | 351/223 |
| 5,888,615 A * | 3/1999 | Mascarenhas et al. | 428/141 |
| 5,890,428 A * | 4/1999 | Hetz | 101/129 |
| 5,916,650 A * | 6/1999 | Rosenbaum et al. | 428/40.1 |

(Continued)

*Primary Examiner*—R. Alexander Smith
(74) *Attorney, Agent, or Firm*—Seed IP Law Group PLLC

(57) ABSTRACT

A tool for measuring, marking, and cutting material, the tool formed of a rigid sheet of transparent material having a transparent flexible sheet of pressure-sensitive material removably adhered thereon to cover one side of the rigid sheet and provide a removable, non-slip surface. One or the other of the rigid and flexible sheets has a plurality of lines formed thereon, preferably two-color lines, to aid in measuring and marking material. The pressure-sensitive material is formed of a non-static cling vinyl film having plasticizers that continually migrate to the surface of the film.

18 Claims, 11 Drawing Sheets

U.S. PATENT DOCUMENTS

| | | | |
|---|---|---|---|
| 6,158,135 A | 12/2000 | Rank | 33/494 |
| 6,171,681 B1 | 1/2001 | Mascarenhas et al. | 428/141 |
| 6,453,573 B1 | 9/2002 | Arnold | 33/622 |
| 6,673,409 B1 * | 1/2004 | Wheatley | 428/40.1 |
| 6,740,355 B2 | 5/2004 | Thiemann | 427/202 |
| 6,854,189 B2 * | 2/2005 | Schafer | 33/1 B |
| 2006/0154029 A1 * | 7/2006 | Antonini | 428/141 |

* cited by examiner

MEASURING TOOL AND METHOD OF MAKING

CROSS-REFERENCE TO RELATED APPLICATION

This application is a continuation of U.S. patent application Ser. No. 11/035,622 filed Jan. 13, 2005, and U.S. Pat. No. 6,854,189, issued Feb. 15, 2005. These applications are incorporated herein by reference in their entirety.

BACKGROUND OF THE INVENTION

1. Field of the Invention

The present invention pertains to rulers used for measuring and marking material, and, more particularly, to a transparent ruler having a removable, non-slip surface.

2. Description of the Related Art

Transparent rulers having grid lines formed thereon are used for measuring and marking material, such as fabric, paper, plastic, and the like. These rulers are also used to guide a tool, such as a razor, knife, or rotary cutter in cutting the material to desired sizes and shapes.

One such ruler is that described in U.S. Pat. No. 4,779,346 in the name of the applicant for a transparent measuring device that includes a plurality of continuous two-color lines of contrasting colors. In use, these lines are visible against a background of multiple colors, thus facilitating the measuring and marking of material. Another ruler is that described in U.S. Pat. No. 5,557,996 issued to Reber et al. on Sep. 24, 1996, that discloses a sheet of transparent material having a first linear slot sized to accommodate a cutter that can extend therethrough to cut several layers of cloth. Reber et al. also discloses using tinted static-cling material cut in predetermined shapes as an aide in cutting fabric shapes for quilting.

To ensure accuracy, it is necessary that the ruler be firmly held in place with respect to the workpiece. Most rulers have a smooth planar bottom surface that will lie flat on the workpiece to be marked or cut. This smooth surface has the disadvantage of allowing the ruler to easily slip over the surface of the workpiece. Thus, a certain amount of force must be applied to a device to hold it in place on the workpiece. This frequently occurs on workpieces formed of or covered with a cloth or fabric material. In quilting applications, where large rulers are used to measure and mark material and to guide cutting tools on large pieces of fabric, it frequently becomes necessary to use both hands to hold the ruler in order to prevent it from slipping on the fabric. This makes it difficult for one person to measure or cut the fabric. Many times an individual will use a foot or knee to assist the one hand in applying pressure to the ruler in order to free the use of the other hand. This method is awkward and is not always feasible, such as in the case of handicapped persons or where the work surface is higher than the waist.

The disadvantage of the ruler described in the Schafer '346 patent is that the smooth surface is subject to slipping on the material. In Reber et al. the static-cling material does not provide a non-slip surface when pushed against the underlying fabric, thus allowing it to slip. The static cling sticker is also subject to peeling off when the ruler is moved over the fabric, and it easily loses its ability to stick to the cutting tool. In addition, the static-cling sticker is tinted, thereby interfering with the transparency of the ruler.

One device that attempts to overcome inadvertent slipping of the ruler is described in U.S. Pat. No. 5,829,150 issued to McEligot on May 1, 1998. Here, a sheet thick enough to guide a rotary cutter along one side and having an adhesive side is removably positioned on a rigid template material. This effectively forms a mechanical stop on the measuring device. The disadvantage is that the adhesive material easily collects dirt, lint, hair, and other material that reduces the adhesiveness and interferes with the use of the ruler. It also does not provide a non-slip surface but rather it forms a raised edge that can itself slide when placed on top of fabric.

Another device that attempts to address this slippage problem is a non-slip cutting ruler disclosed in U.S. Pat. No. 5,471,749, which teaches using retractable pins that secure the ruler to the fabric. This is a complex and potentially injury-causing approach that has not met with much success in the marketplace.

A further approach is to clamp the tool to the material, which is the subject of U.S. Pat. No. 4,875,667 in the name of the applicant that describes an elongate bar having a clamp at one end to brace the other end of the bar on a support surface. The other end of the bar is pushed down on a ruler and the underlying fabric. Unfortunately, this device can break the ruler when the bar is pressed down too hard. In addition, the bar is cumbersome to use and expensive.

Other methods have been employed to reduce slipping, such as: die-cut dots made from rubber, sandpaper, and cork; handles with suction cups to attach to the top surface of the tool; handles with pins that protrude through the plastic and into the fabric; weights; clear fingernail polish with salt; and ink with grit therein. These methods create one problem while solving another, including not providing enough grip, or gripping too much and snagging the fabric, scratching the work surface, not being transparent, wearing out, leaving adhesive on the ruler or the fabric, or cracking, crazing, or otherwise damaging the tool.

BRIEF SUMMARY OF THE INVENTION

In accordance with the disclosed embodiments of the invention, a tool for measuring and marking fabric is provided that includes a sheet of rigid transparent material having opposing first and second planar sides, and a sheet of flexible, transparent material removable adhered to one of the first and second sides to provide a removable non-slip surface. Ideally, the sheet of flexible material entirely covers one of the first and second sides of the rigid sheet of material and is formed of a vinyl with plasticizers that adheres through surface tension. Lines for measuring and marking are formed on one of either the first and second planar sides of the rigid sheet or on the sheet of flexible material.

In accordance with another embodiment of the invention, the flexible sheet of material is formed of segments of flexible sheets adhered to the rigid sheet of material.

In accordance with another embodiment of the invention, a transparent measuring device is provided that includes a sheet of transparent material having opposing surfaces; one or more multicolor markings applied to one of the opposing surfaces on the sheet, each of the multicolor markings comprising a first image and a second image, the first image and the second image having contrasting colors, the first image having a colored area with one or more uncolored areas formed inside the colored area and the second image having one or more contrasting colored areas that at least completely fill one or more of the uncolored areas; and a transparent sheet of flexible material removably adhered to one of the opposing surfaces and sized and shaped to completely cover the one opposing surface to which it is adhered.

In accordance with another embodiment of the invention, a method of making a tool for measuring and marking material is provided. The method includes providing a transparent sheet of rigid material having first and second opposing planar sides and a plurality of lines formed on one of the first and second opposing planar sides; providing a transparent sheet of non-static cling, non-slip flexible material; sizing the sheet of flexible material to substantially cover only one of the first and second opposing planar sides of the sheet of rigid material; and placing the sized sheet of flexible material on only one of the first and second opposing planar sides of the sheet of rigid material to substantially cover only the one side of the sheet of rigid material and to provide a non-slip bearing surface when placed on the material.

The present invention avoids the disadvantages of prior methods and achieves a removable non-slip surface that is easily applied and removed, is easily cut to size, is totally transparent, can be interchanged between rulers, will adhere when pressure is applied, does not snag fabric or materials when manipulating the ruler, prevents markings between the ruler and the flexible sheet from rubbing off, can be marked on for a visual aid on the underside of the ruler, resists rolling back from the edge, can be used to create an inking edge, can be taped with clear tape for more permanent adhesion, can be printed on prior to applying to blank plastic, does not damage or alter the ruler, can be used with any flat ruler or template, and is inexpensive, easy to use, and easily understandable.

BRIEF DESCRIPTION OF THE DRAWINGS

The foregoing features and advantages of the disclosed embodiments of the invention will be more readily appreciated as the same become better understood from the following detailed description when taken in conjunction with the accompanying drawings wherein.

DETAILED DESCRIPTION OF THE INVENTION

The disclosed embodiments of the invention will be described in conjunction with the transparent measuring devices previously disclosed by applicant in U.S. Pat. Nos. 4,779,346 and 5,819,422, which are incorporated in their entirety herein by reference. The description of these prior devices and related methods is set forth below, and such description includes the improvements of the present invention where applicable.

Figure 1:
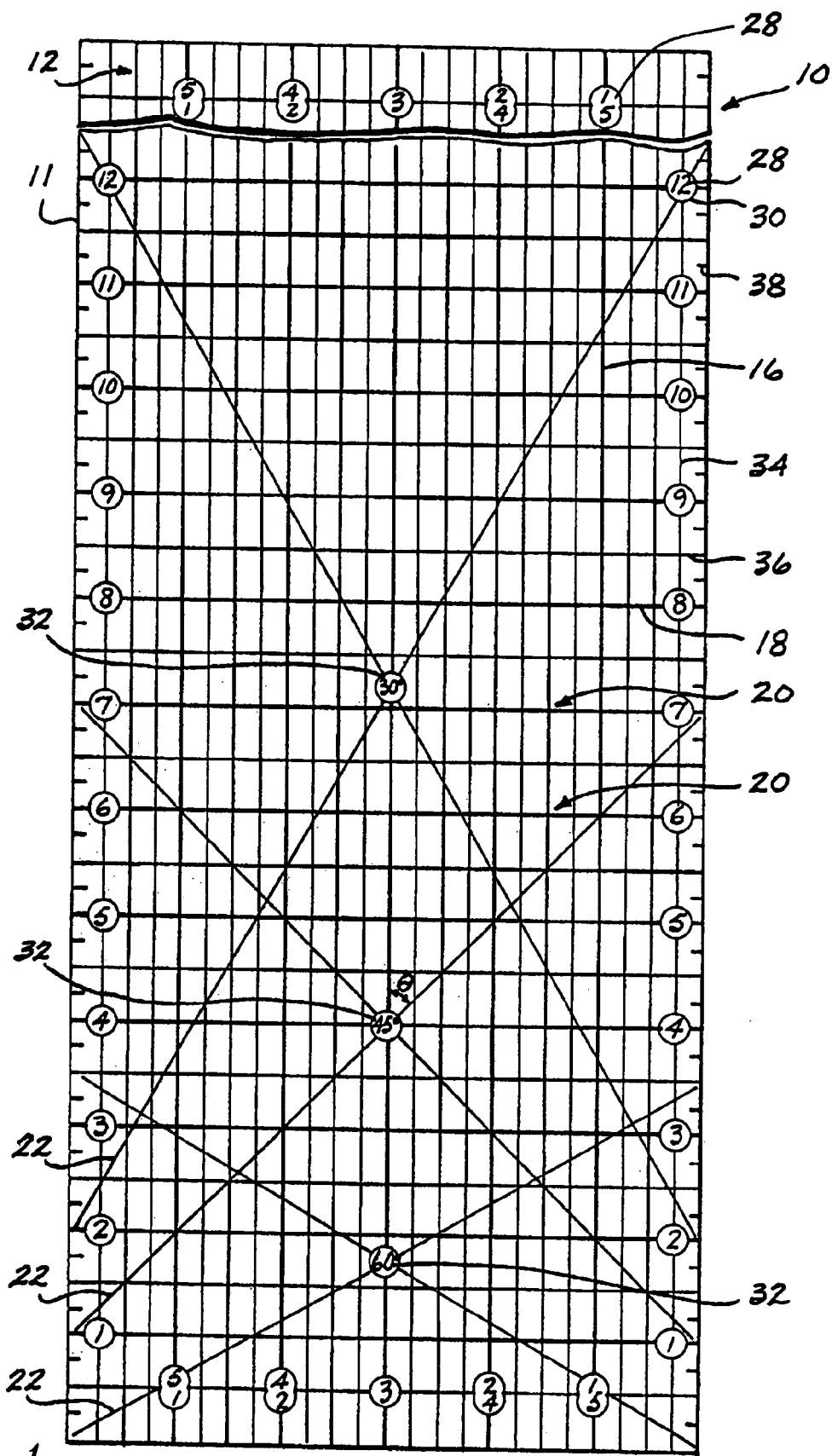
FIG. 1 is a plan view of a tool formed in accordance with one embodiment of the invention.
Figure 2:
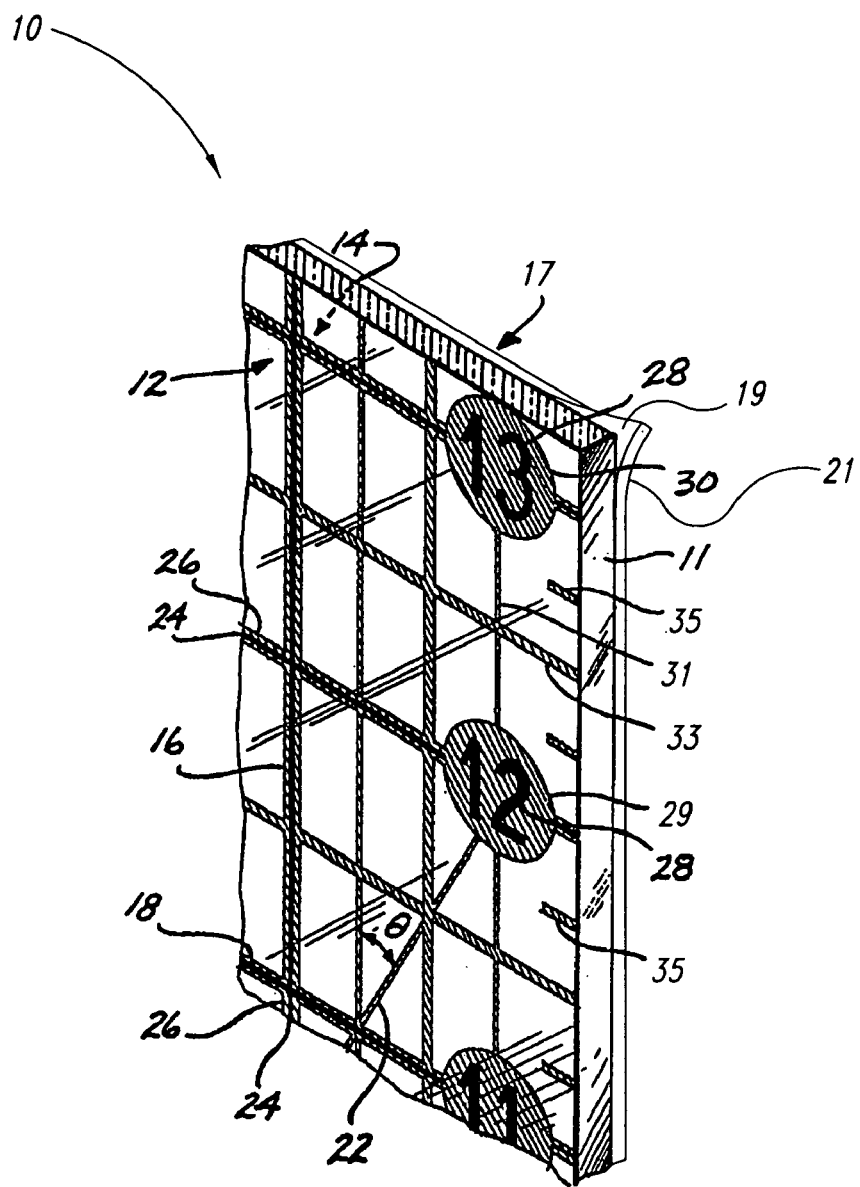
FIG. 2 is an enlarged isometric view of a portion of the tool of FIG. 1.

FIGS. 1 and 2 illustrate a representative embodiment of a tool 10 formed in accordance with one embodiment of the present invention. The measuring tool 10 includes a sheet 11 of transparent material having a planar front surface 12 and an opposing planar back surface 14. The sheet 11 may be formed from any suitable transparent material such as acrylic plastic. As shown, the tool 10 is rectangular, having a preferred length of twenty-four (24) inches and a width of six (6) inches. However, it is to be understood that the tool 10 may be formed in other shapes and in different dimensions. A transparent sheet of flexible material 17 is adhered to the sheet 11, as will be described in more detail herein below.

A pattern of composite lines is formed on the front surface 12 of the rigid sheet 11, the pattern including a plurality of vertical lines 16 running across the width of the sheet and a plurality of horizontal lines 18 running across the length of the sheet. The vertical lines 16 and the horizontal lines 18 are positioned substantially at right angles with respect to one another to thereby create a grid pattern formed of squares 20. In addition to the horizontal and vertical lines, there are angled lines 22 placed on the grid to form angles of 30 degree., 45 degree., and 60 degree., with either the vertical or horizontal lines. Angled lines 22 enable a user of the measuring device to orient the device at the indicated angles, so that the material can be measured, marked, or cut at an angle to a given line.

As is more clearly shown in FIG. 2, each of the horizontal and vertical lines is formed of a first line 24 and a second line 26. The first line 24 is of a first color (or hue) and the second line 26 is of a second color (or hue) that is different from the first color. Preferably, the first line 24 is superimposed upon the second line 26, and the first line 24 is of a lesser breadth than that of the second line 26, such that the second line 26 is visible on each side of the first line 24 when viewed from the front surface 12. However, the first line 24 and the second line 26 may also be placed in adjacent or partially overlapping relationship, so long as the two different colors are visible from the front surface 12. The first and second colors are of a contrasting nature, such as yellow and dark green, white and black, dark orange and light blue, black and yellow, or other combinations such that either one of the colors will be visible against backgrounds of various colors or against a multicolored background.

For purposes of illustration, FIG. 2 shows lines 24 and 26 formed on the front surface 12 of the measuring device 10. However, it will be understood that the lines could equally well be formed on the back surface 14 of the rigid sheet 11, and that such back surface lines would have the advantage of reducing parallax errors. Combinations of front and back surface lines may also be used. The lines 24 and 26 may be formed by any suitable printing process, such as by a silk screen, lithograph press, or photographic process, by an engraving process such as laser engraving, or by combinations of the above techniques.

In the illustrated embodiment, each horizontal and vertical line 24, 26 is consecutively numbered by numbers 28 placed at each line. The numbers 28, preferably of the first color, are formed to be positioned within an enlarged circle 30, preferably of the second color. As illustrated herein, the numbers 28 correspond to the distance of each line from an edge of the grid, preferably in inches, although other units may be used. In addition, the angled lines 22 have markings representing the angle in degrees that each angled line 22 makes with the vertical lines 16 as measured at angles θ. Preferably, the squares 20 are further subdivided by vertical subdivision lines 31 and horizontal subdivision lines 33 placed between the vertical lines 16 and the horizontal lines 18. In addition, subdivision marks 35 are shown placed along the length of the measuring device 10 and on the edges thereof.

Turning next to the flexible sheet 17, this sheet 17 has opposing first and second sides 19,21. In a preferred embodiment, the flexible sheet 17 is formed of 8 mil thickness plastic, although a thickness in the range of 5 mil to 10 mil can be used. While a thickness outside this preferred range is possible, optimum results may not be achieved.

In the embodiment shown in FIG. 2, the first side 19 of the flexible sheet 17 is adhered by surface tension alone to the back surface 14 of the rigid sheet 11. However, the second side 21 of the flexible sheet may be used instead to adhere to the front surface 12 of the rigid sheet 11 without a difference in performance. Moreover, either one of the first and second sides 19,21 of the flexible sheet 17 may be adhered to the front surface 12 of the rigid sheet 11 instead of the back surface 14, as desired.

In a preferred embodiment of the invention, the rigid sheet 11 is configured to have continuous two-color lines formed thereon. Ideally, the method disclosed in U.S. Pat. No. 5,819,422 is used to apply the lines to the front or back surfaces 12,14 or the rigid sheet 11. The description of this method is repeated below.

Figure 3:
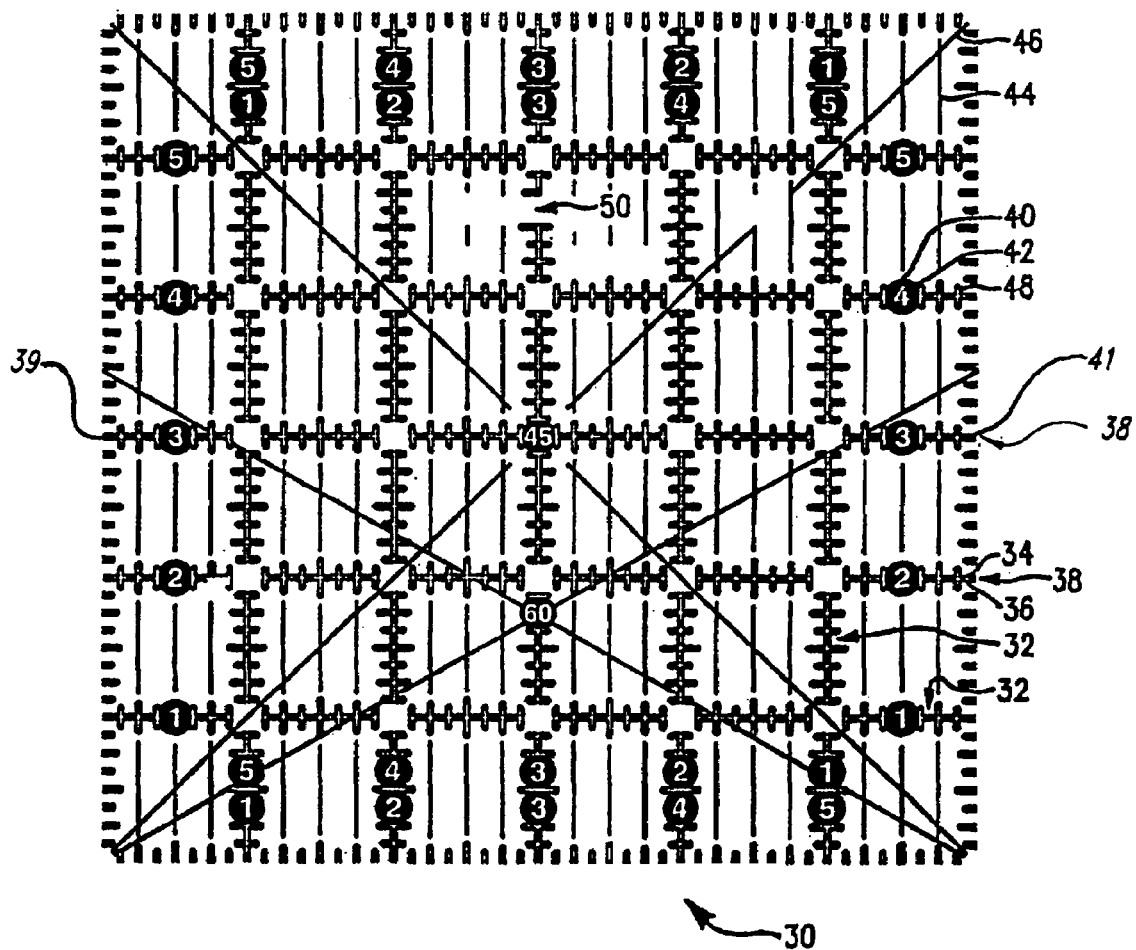
FIG. 3 is a top plan view of the first image to be applied to the sheet of transparent material in accordance with the present invention.

Referring to FIG. 3, shown therein is a first image 30 consisting of a pattern of horizontal and vertical graduations 32 with short subdivisions 48 extending therefrom at substantially right angles. Each graduation 32 and subdivision 48 is formed from a pair of lines 34 and 36 that outline an uncolored gap 38.

Ideally, the lines 34 and 36 have a width in the range of 1 one-thousandth of an inch to 20 one-thousandths of an inch, although the width could be greater depending on the application. The preferable width for quilting applications is in the range of 15 one-thousandths to 20 one-thousandths. The uncolored gap 38 is centered between the pair of lines 34 and 36, and has a preferred width of 2 one-thousandths of an inch, although again this could be smaller or larger, depending on the application and the capabilities of the image creation equipment. This provides the manufacturer and operator with greater tolerances within which to transfer the images and yet maintain precise alignment.

Preferably, the uncolored gaps 38 are bounded on substantially all sides by the pair of lines 34 and 36, and they are disposed centrally therein. The longitudinal ends 39 and 41 of the gaps 38 are not bounded, and there may be applications where there are segments that are unbounded along the length of the composite lines. There may also be applications where it is preferred that the gaps 38 not be centered between the pair of lines 34 and 36. Hence, variations are contemplated in the present invention.

The first image 30 includes large darkened circles 40 that have uncolored number spaces 42 formed therein. In addition, the first image 30 includes solid vertical lines 44, and angled lines 46 that are of the same color as the graduations 32, although they do not form a part of the multicolor graduations 32. The large blank area 50 is used for the Omnigrid trademark, which is discussed more fully below.

Figure 4:
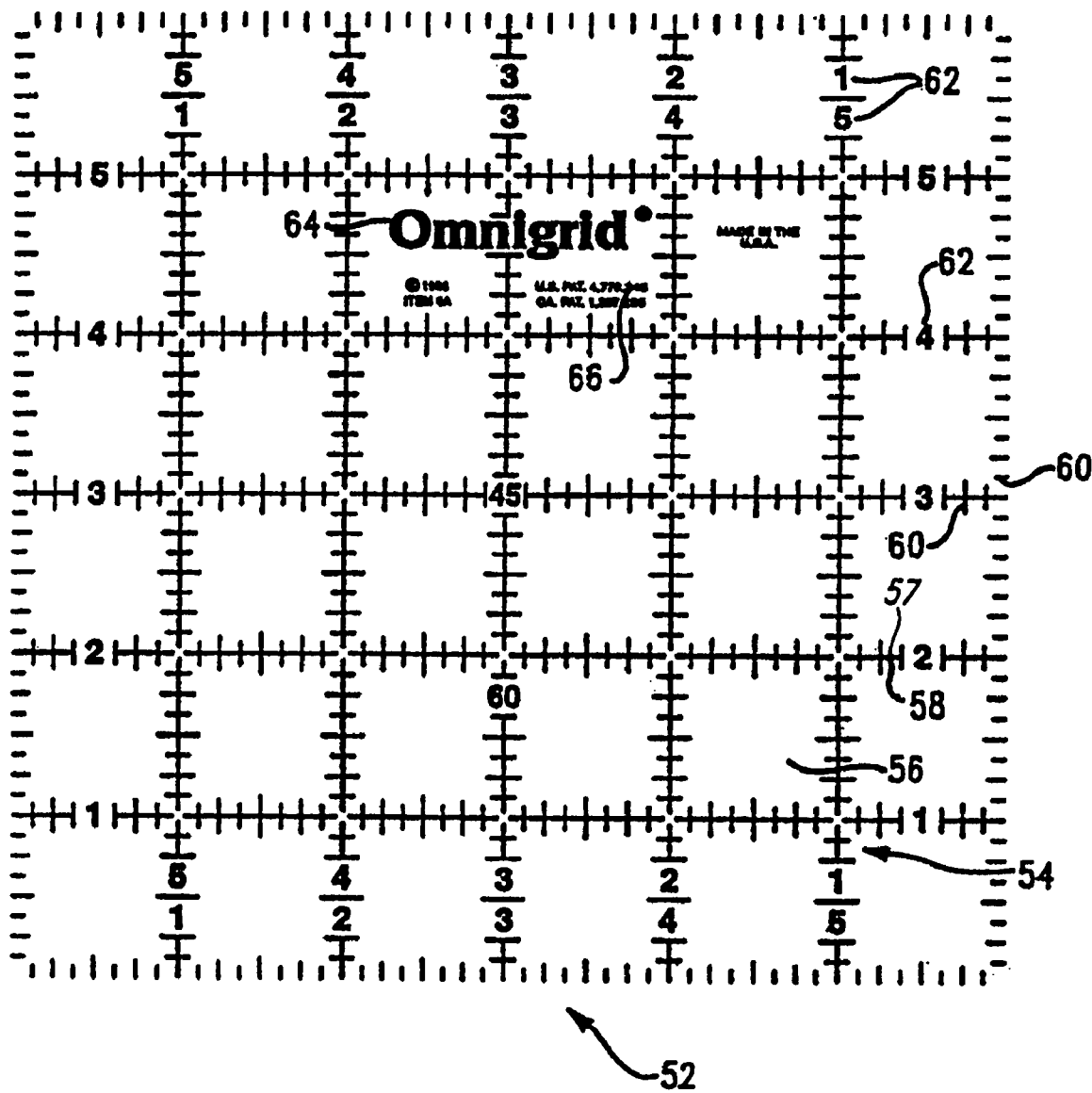
FIG. 4 is a top plan view of the second image to be applied to the sheet of transparent material in accordance with the present invention.

In FIG. 4 is shown a second image 52 comprising solid horizontal lines 57 and vertical lines 58 forming a grid pattern 54 of squares 56. This second image 52, as well as the first image 30, is shown in the form it would appear on camera-ready film. Each of these lines 57 and 58 has subdivision lines 60 that further divide the lines 58 into smaller units of measurement. In addition, each of the lines 57 and 58 has corresponding numbers 62 along the outside rows and columns of squares 56. In the embodiment depicted herein, these numbers 62 correspond to inches, although other units of measurement may be used, such as metric units. The Omnigrid trademark 64 and other legends and indicia 66 appear inside the squares 56.

Preferably, the lines 57 and 58 have a width that is 2 one-thousandths of an inch wider than the width of the uncolored gap 38 formed by the graduations 32. In other words, if the uncolored gap 38 is 12 one-thousandths of an inch wide, the lines 57 and 58 would be 14 one-thousandths of an inch wide. In addition, the numbers 62 are preferably 2 one-thousandths of an inch larger than the corresponding uncolored numbers spaces 42 formed in the circles 40 on the first image 30. The intersection of the horizontal and vertical lines 57 and 58 is left blank to provide an unobstructed viewing space that enables a user to precisely align the measuring device.

Figure 10:
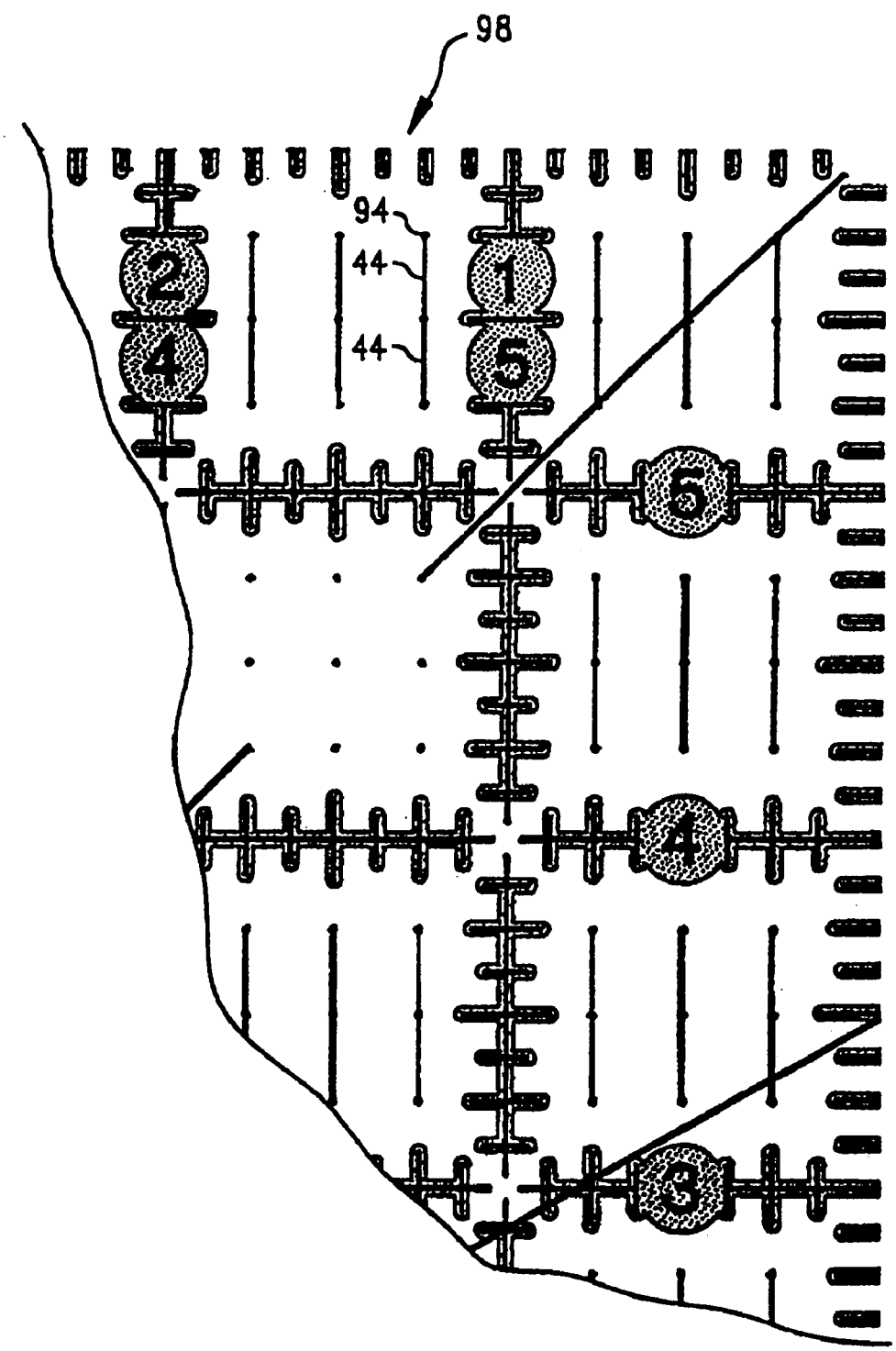
FIG. 10 is a top plan view of the composite image formed in accordance with the alternative embodiment of FIGS. 7 and 8.

When the first and second images 30 and 52 are combined, they form a composite image, as will be described more fully below in conjunction with FIG. 10. Briefly, the first image 30 is applied to the back surface of a transparent sheet, and the second image 52 is aligned and applied on top of the first image 30. When the images 30 and 52 are so combined, the contrasting colored second image 52 fills in the gaps 38 and number spaces 42 on the first image 30, creating a composite set of lines.

The process for making the transparent measuring device of the present invention can be done by a variety of methods. Although the use of ink to create the images is described herein, other materials or processes may be used, including pigment, toner, photographic deposit, and photosensitive emulsion.

The preferred method is the screen printing process because it permits the application of a heavy deposit of ink. By way of general description, in the process of the present invention the images described above are first created and then transferred to a screen. The screen is a commercially-available material that has a thread count in the range of 150 to 400 threads per inch.

Ideally, the images 30 and 52 are created as electronic images on a computer using a commercially-available graphics program that is capable of large magnification and line generation down to and even below 1 one-thousandth of an inch. Each electronic image is then generated on to camera-ready film, such as is shown in FIGS. 3 and 4, after which it is transferred to a screen through a photo emulsion process, which is well-known in the industry.

Alternatively, present methods do permit the direct transfer of an electronic or computer image to a print screen, bypassing the step of using an ortho film, although this is much more expensive. In addition, a lithograph press, an engraving process, thermal (hot) stamping of foil, or a photographic process may also be used, as well as any combination of graphics and manufacturing. Finally, high-speed laser printers that print the computerized image directly to a plastic sheet are also available. Virtually any pigment transfer method may be used to generate the images of the present invention on the transparent sheet. Another method takes advantage of precision cutting equipment to cut out pre-printed adhesive plastic that can be applied as a layered substrate to the transparent sheet.

Continuing with the method of the present invention, once the screen is formed for the first image 30, it is mounted in accordance with conventional screen printing methods. A sheet of transparent material, preferably acrylic, such as the sheet 12 described above, is placed below the screen in a jig that holds the plastic sheet in place, as will be described in more detail below. The ink is then applied with a squeegee as is well-known in the art. It is important that the sheet of plastic be cleaned prior to the application of ink. A quick method is to use a roller on the sheet, which picks up dirt and other material off the sheet.

In the method of the present invention, the image 30 of FIG. 3 is first applied to the back surface 14 of the sheet 11. It is preferable that the first image be of a lighter color or hue, such as yellow. However, a darker or contrasting color or hue can be used for the first image, such as black or dark-shade green. When so applied to the sheet 11, the graduations 32 outline the uncolored gap 38 with uncolored subdivisions 48. In addition, the circles 40 have uncolored numbers 42 formed therein. The image 32 is then inspected and, if acceptable, set aside to dry.

After the ink from the first image has dried, the screen having the second image 52 thereon is mounted and aligned with the first image 30. Alignment is much quicker and easier, because the lines 58 and numbers 62 will cover the corresponding uncolored areas with a slight overlap. This overlap allows a small error in the alignment without resulting in misalignment of the lines 58 and numbers 62 in the corresponding uncolored gaps 38 and number spaces 42 created by the first image. The second image is then printed on the sheet using a contrasting darker color or hue. When viewed from the front surface 12 of the sheet 11, the darker lines 58 and numbers 62 will register perfectly within the gap 58 and number spaces 42 in the wider lighter line, even though the second image 52 may be slightly misaligned.

This application of the second image 52 is not an overlay of ink over the first image. Rather, it is the application of ink in the blank, un-inked areas or gaps 38 left by the first image 30, and only a slight overlap exists. As such, this method not only results in precise registration of the smaller darker line within the larger lighter line, it also reduces bleeding of one color into the other as can occur with an overlay. If the color of the first image 30 is totally opaque, then the second image 52 can have a width of two one-thousandths less than the width of the first image 30.

It has been noted that confusion as to which side of the sheet is the top side may result from having the contrasting colors visible from both sides of the sheet of transparent material. One method for overcoming this confusion is to apply an overlay of one color on the first two images, thus making only the overlay visible from the back side of the transparent sheet.

Figure 5:
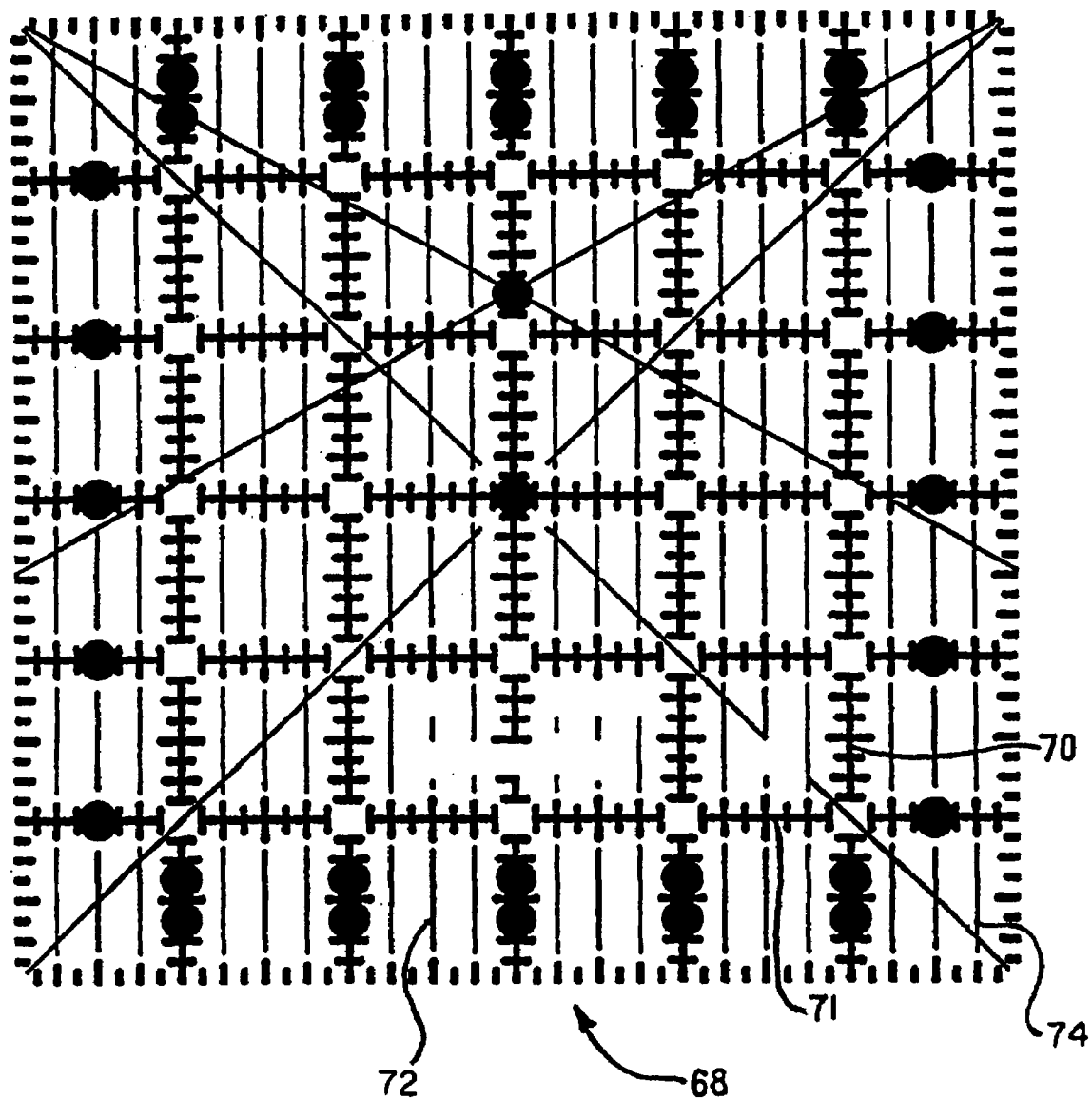
FIG. 5 is a top plan view of a third image to be applied to the sheet of transparent material in accordance with another embodiment of the present invention.

In this regard, FIG. 5 illustrates a third image 68 that consists of a grid pattern of thick, solid vertical lines 70 and horizontal lines 71 that are wider than the solid lines 57 and 58 of the second image 52 and slightly smaller than the graduations 32 and other lines 44 and 48, and circles 40 in the first image 32. Additional vertical lines 72 and angled lines 74 are used, which are also of a smaller width than the corresponding vertical lines 44 and angled lines 46 shown in FIG. 3.

Ideally, the lines 70 are 1 to 2 one-thousandths of an inch smaller than the corresponding lines in the first image 30. This third image 68 can be applied over the second image 52 as an overlay. This overlay encapsulates the first two images 30 and 52, improving the appearance and protecting the images, thus increasing the useful life of the tool 10. It also aids users in determining which side of the tool 10 is the front surface 12 because the overlay only permits the viewing of the composite multicolor lines from the front surface 12. The third image 68 ideally is of a color or hue that matches the first image 30, in this case a lighter color, such as yellow.

As a result of adding the overlay, another step is added to the process. Because the third image 68 is slightly smaller, minor misalignment will not be detected. Even though a third step is added in this embodiment, the overall efficiency and speed is still improved over the prior method. In addition, fewer rejections will result and a high-quality product will be produced virtually each run. However, the third image may not be necessary, such as in the lithographic process, where the second image (black in this case) is of a width to cover the entire or almost the entire first image (yellow in this case).

Figure 6:
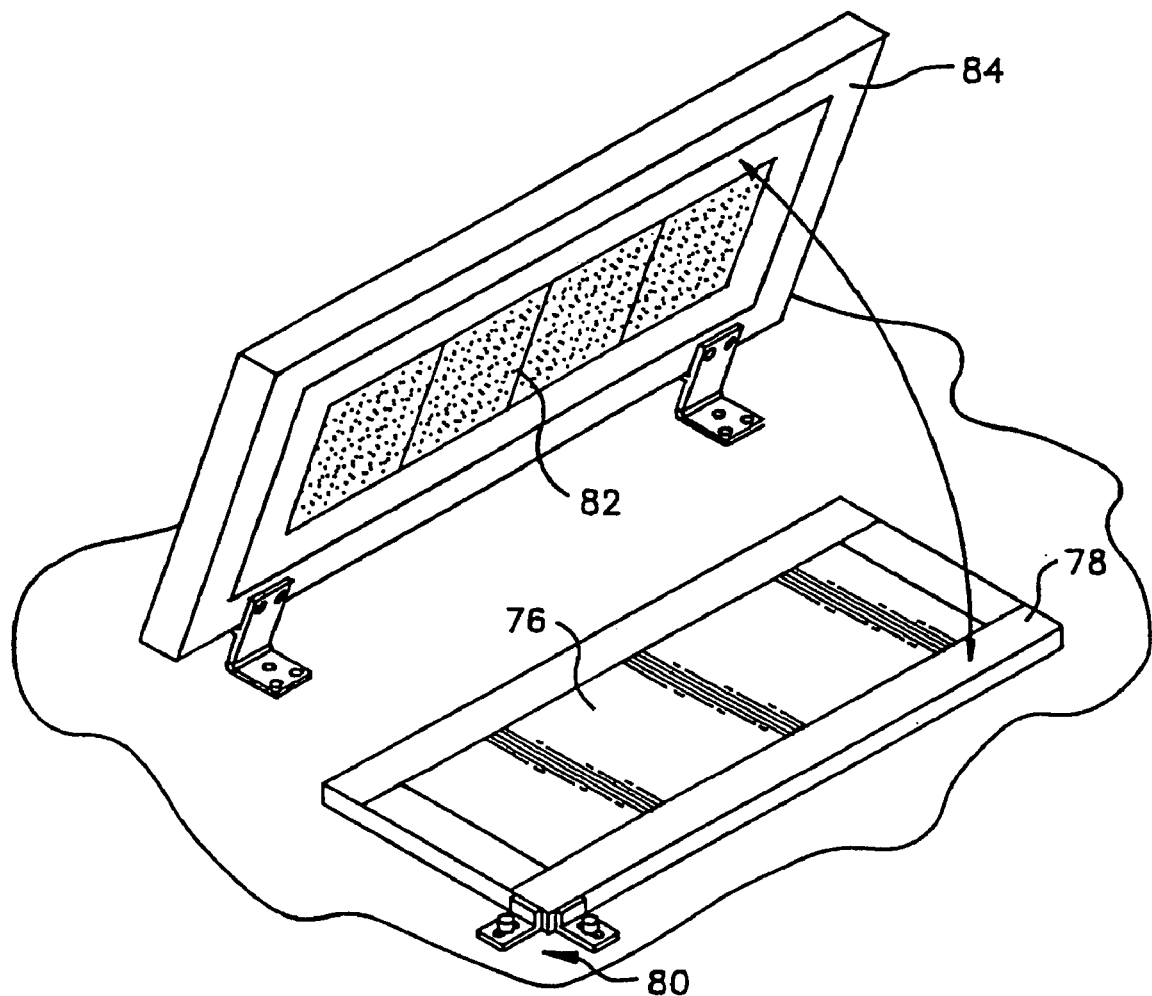
FIG. 6 is an isometric view of a screen printing apparatus for printing images in accordance with the process of the present invention.

FIG. 6 illustrates a screen printing apparatus for carrying out the method of the present invention. In particular, shown therein is a plastic sheet 76 placed in a jig 78 that holds the sheet 76 in place. The screen 82 is mounted in correlators or registration clamps 84. The jig clamps 80 may be adjusted to position the plastic sheet 76 precisely in position under the screen 82. The correlators 84 also include similar adjustment mechanisms (not shown) for making minor adjustments in the position of the screen 82.

The screen 82 is rotated into position over the plastic sheet 76 where ink is applied and a squeegee pushes the screen 82 down on the plastic sheet 76, as is well known in the art. The sheet 76 with the image printed thereon is then removed.

As will be appreciated from the foregoing, the present invention results in a higher production rate using less-skilled labor that achieves the same or better quality product. It is also to be appreciated that changes made be made without departing from the spirit and scope of the invention. For instance, the steps described above may be reversed, with the third image 68 applied to the sheet first, then the second image 52, and finally the first image 30. Alternatively, the third image can be eliminated and the first two images used. If the reverse steps are done, the images must be applied to the front side of the sheet so the second and first images will be visible. The drawback to this method is the possibility of parallax errors in viewing the lines on the top of a thick sheet of transparent material.

While a thick piece of material is preferred in order to act as a cutting guide for rotary cutters, scissors, razors, and other cutting tools, as well as a measuring and marking device, the present invention can be applied to sheets of thinner material that are then laminated together. For example, rolled sheets of 5 mil plastic can be printed by one of several methods described above, then cut and removably adhered to thin or thick transparent plastic sheets. A single color may be applied to any combination of the two sheets and then aligned prior to adhering of the sheets.

Figure 7:
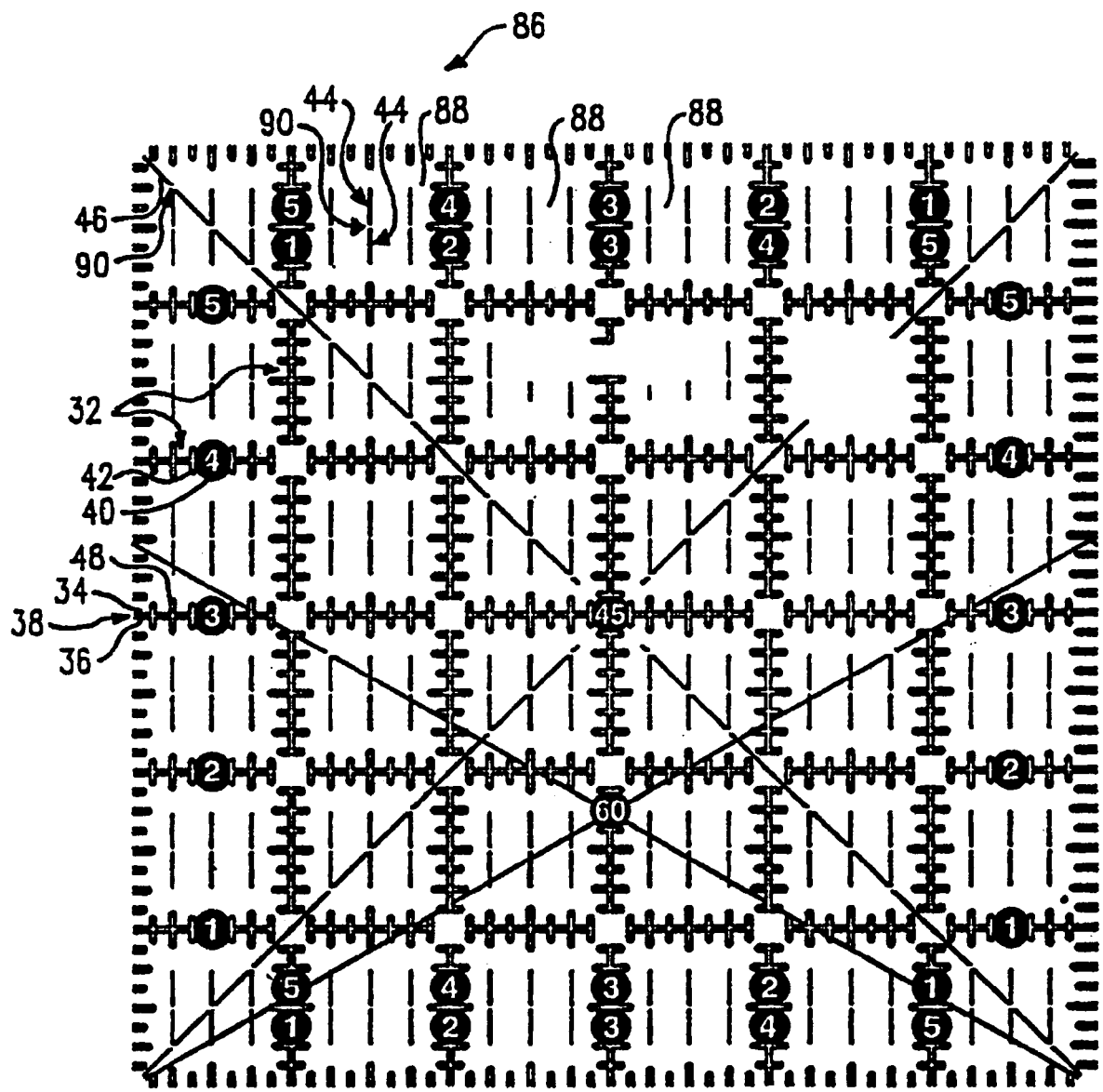
FIG. 7 is a top plan view of a first image to be applied to a sheet of transparent material in accordance with an alternative embodiment of the present invention.

FIGS. 7–10 illustrate another embodiment and further improvement in accordance with the present invention. For ease of illustration, the same reference numbers will be used for the common subject matter illustrated in FIGS. 3–5 and 7–10. Shown in FIG. 7 is a first image 86 wherein the solid vertical lines 44 in each square 88 are broken at their vertical midpoint to leave an open gap 90. Each angled line 46 is also broken at their junction with a vertical line 44 to leave the gap 90 open. In all other respects the first image 86 is identical to the first image 30 illustrated in FIG. 3. It is to be understood that the vertical lines may have more than one gap 90 formed therein. The gaps 90 may appear at regular or irregular intervals depending on the application, the scale, and the overall design.

Figure 8:
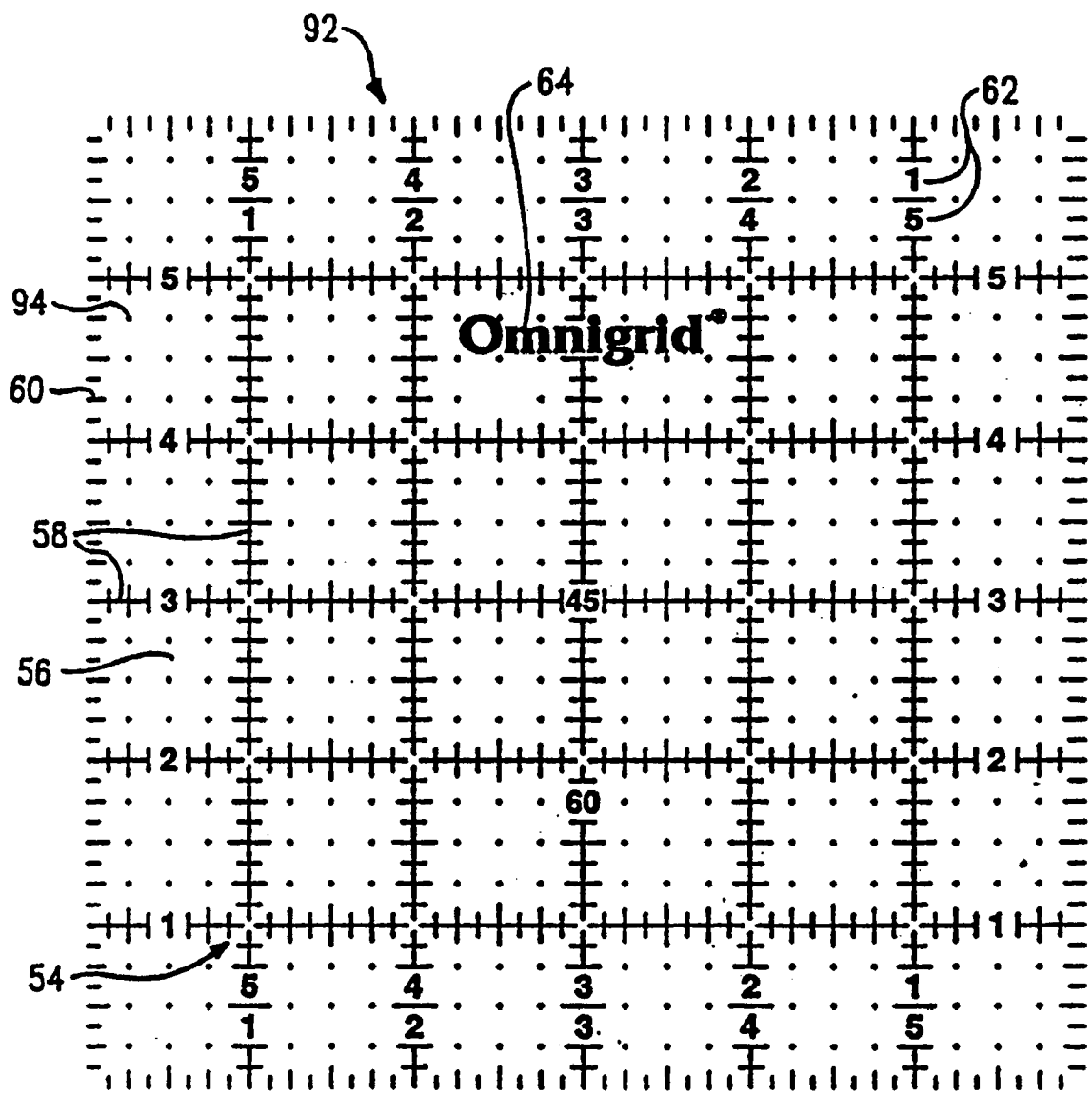
FIG. 8 is a top plan view of a second image to be applied to the sheet of transparent material in accordance with the alternative embodiment of FIG. 7.

FIG. 8 illustrates a second image 92 having squares 56 that include a plurality of dots 94. The dots 94 are positioned in each square 56 such that when the second image 92 is applied over the first image 86, the dots 94 will be located in the gaps 90 created in the vertical lines 44. Ideally, the dots 94 are of a larger size than the gaps 90 and of a contrasting color from the solid vertical lines 44 so they will be more readily visible to the user. These dots 94 will aid in aligning and measuring subdivisions on the transparent measuring device. It is to be understood that the dots 94 may be the same size or smaller than the gaps 90 if desired.

Figure 9:
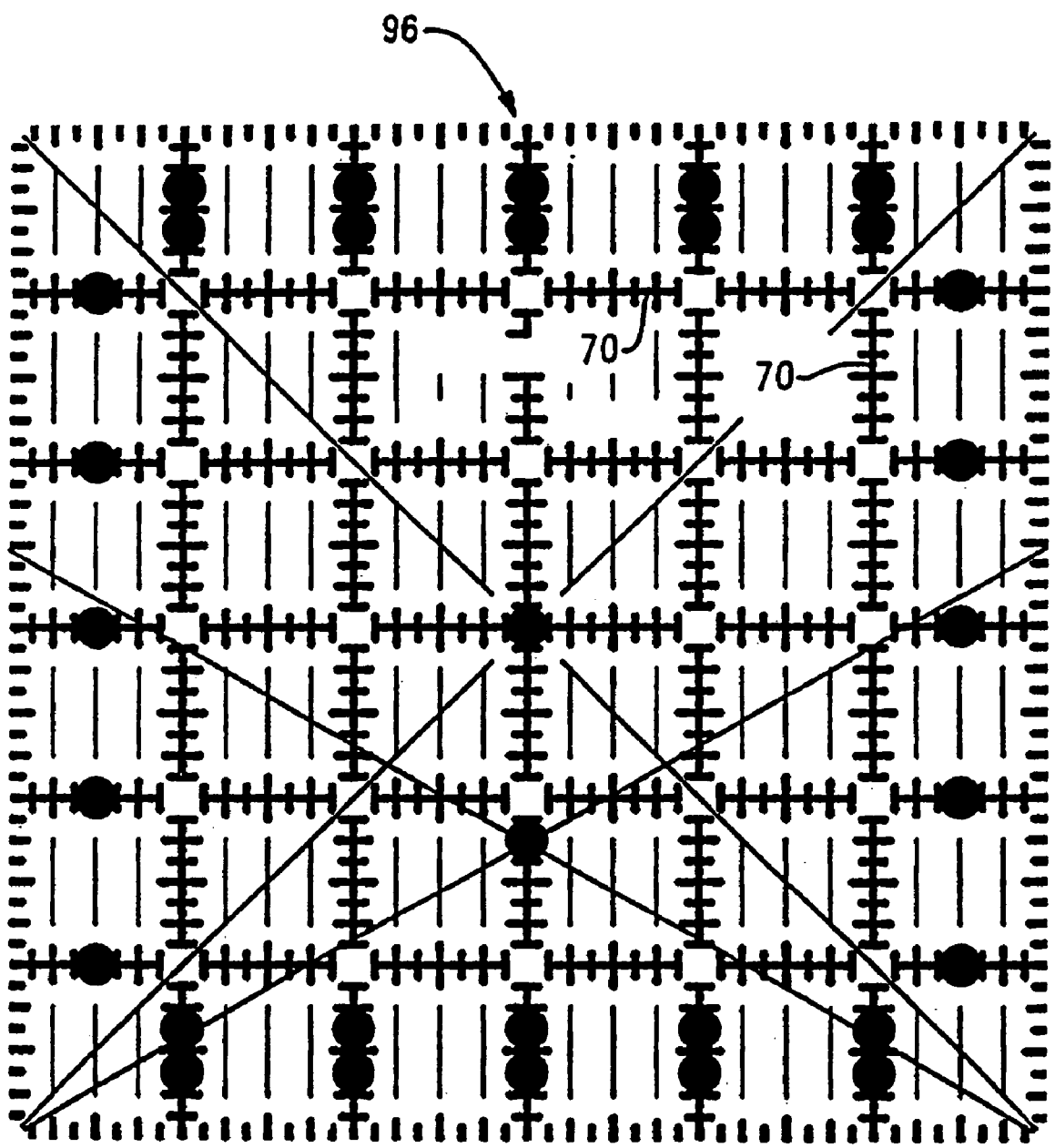
FIG. 9 is a top plan view of an optional third image to be applied to a sheet of transparent material in accordance with the alternative embodiment of FIGS. 7 and 8.

An optional third image 96 is shown in FIG. 9, which corresponds to the third image 68 illustrated in FIG. 5. The final composite image 98 consisting of the combination of the first image 86, the second image 92, and the third image 96, is shown in FIG. 10, where the dots 94 are visible between the broken solid vertical lines 44 and the angled lines 46. The process described above can be reversed if the composite image is to be applied to the opposite side of the transparent sheet.

Turning next to the flexible sheet 17 of the present invention, as shown in FIG. 2, the transparent flexible sheet 17 is preferably formed of a vinyl material having plasticizers therein that hold the sheet 17 to the rigid sheet of material 11 by surface tension alone. No adhesives are used and there is no use of attraction based on static electricity. Ideally, the flexible sheet of material 17 is formed from cling vinyl material, identified as CV-800-TC-245 100 DW available from FLEXcon in Spencer, Mass. This material is a pressure-sensitive film, and more particularly is a topcoated highly plasticized cling vinyl film having plasticizers that continually migrate to the surface. It may be applied wet or dry, and in a preferred method of use it is applied dry, although it may be dampened as desired for larger applications.

In one embodiment, the flexible sheet of material 17 is sized and shaped to completely cover only the surface of the rigid sheet of material 11 to which it is applied. This may be a single sheet or formed from a plurality of flexible sheet segments separately adhered to the rigid sheet of material 11. In another embodiment, the lines may be formed on the flexible sheet of material 17, as described below, which is then applied to a blank piece of plastic of the same size.

Figure 11:
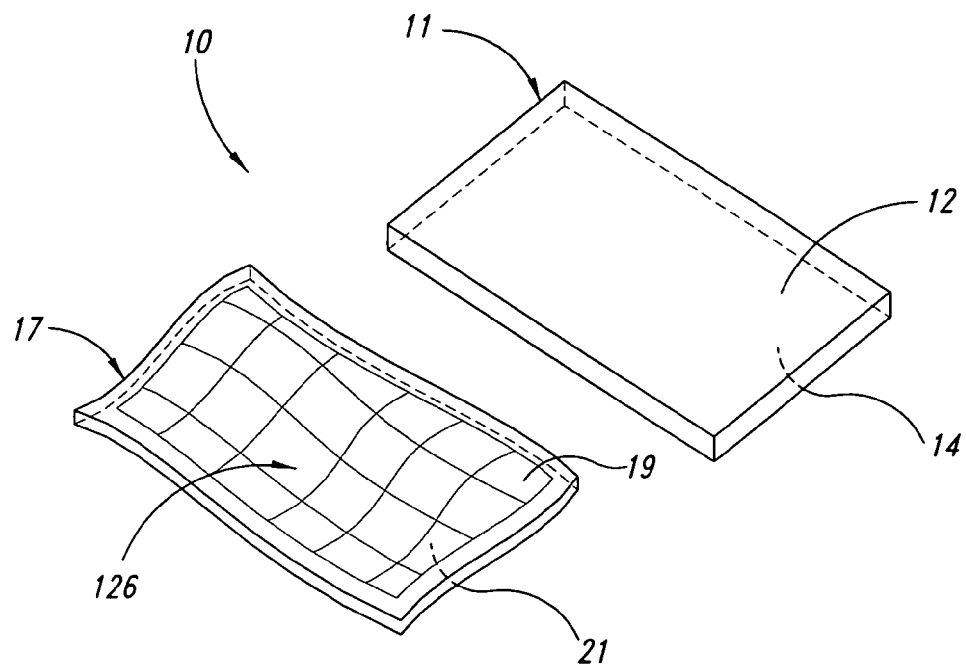
FIG. 11 is an exploded isometric view of another embodiment of a tool.

In accordance with a method of the present invention, a large piece of the flexible sheet 17 is placed on a work surface 100, such as a cutting mat, as shown in FIG. 11. The rigid sheet 11 is placed thereon with the side to be covered, in this case the back surface 14, in contact with the flexible sheet 17. A cutting tool 102, in this case a rotary cutter, is then used, guided by the rigid material, to cut the flexible material into a single sheet of flexible material 17. The sides 104 of the rigid sheet 11 are used as a guide for the blade 106 of the cutting tool 104 to ensure the flexible sheet 17 is cut to the same size as the back surface 14 of the rigid sheet 11.

In applications where the rigid sheet 11 is much larger than the flexible sheet 17, the flexible sheet 17 may be cut into segments that are then adhered to completely cover the back surface 14 of the rigid sheet 11.

Figure 12:
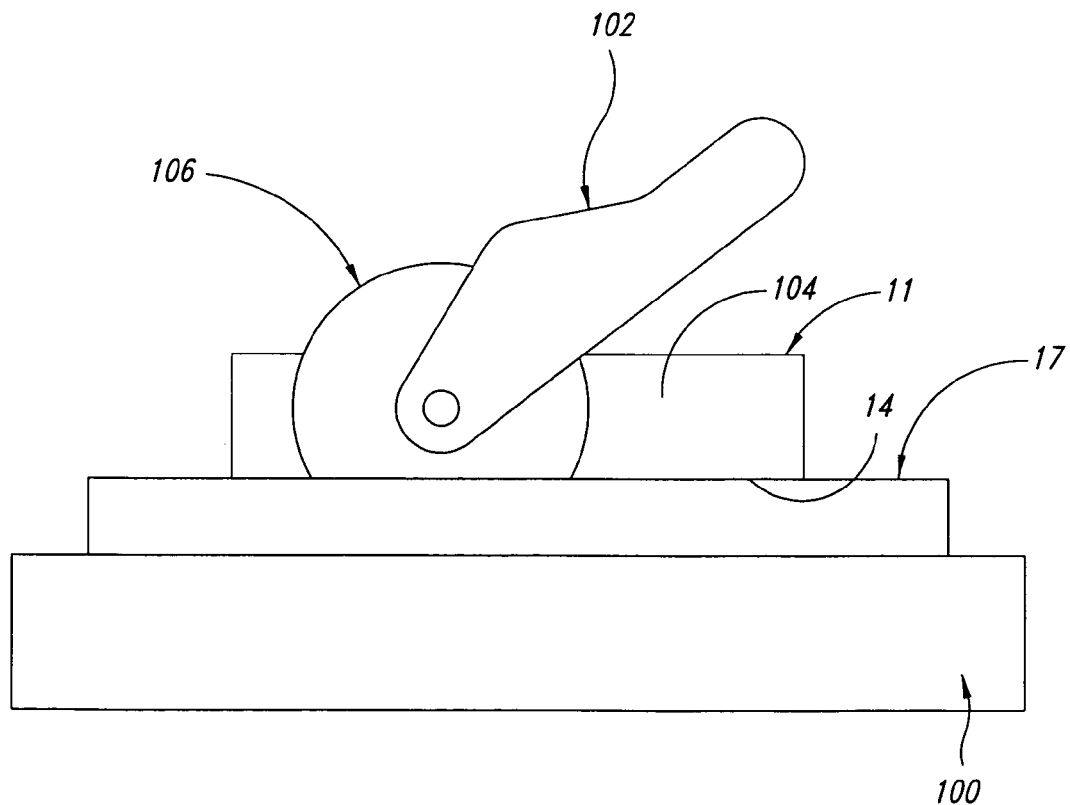
FIG. 12 is a side plan view of a method of forming the tool in accordance with another embodiment of the invention.

In another embodiment shown in FIG. 12, a tool 120 is shown formed of a blank sheet 122 of transparent, rigid material that is used in conjunction with a flexible sheet 17 having a grid 126 of measuring lines formed thereon. The grid 126 may be formed on the front or back sides 19,21 in the manner described above with respect to FIGS. 3–6 and 7–10.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Although the use of adhesive is not preferred because it is expensive, inconvenient, and can collect dirt and debris, it is recognized that adhesive may be necessary with certain materials or with smaller sizes of the flexible sheet material. Conventional adhesive suitable for use with the non-static pressure sensitive film is readily commercially available in various degrees of tack and will not be described in detail herein. It is also recognized that the flexible sheet may be formed into smaller segments and placed on the back of the ruler in discrete locations such that complete coverage of the ruler back is not achieved. While this is not preferred because it lessens the non-slip characteristics of the tool and because smaller segments of the flexible sheet material do not cling as well to the back of the ruler, this is one alternative available to users who may need to conserve the flexible sheet material. Accordingly, the invention is not limited except as by the appended claims and the equivalents thereof.

The invention claimed is:

1. A tool for use in measuring and marking material, comprising:
    a transparent sheet of rigid material having a plurality of lines formed on a first side thereof, and
    a transparent sheet of non-static cling, flexible material removably adhered to the first side of the sheet of rigid material with surface adhesion only and configured to cover substantially the entire first side of the sheet of rigid material and provide a non-slip planar surface that resists slipping on the material to be measured and marked and does not alter the first side of the sheet of rigid material when applied thereto or removed therefrom, the transparent sheet of flexible material comprising plasticizers that continually migrate to surfaces of the transparent sheet of flexible material.

2. The tool of claim 1 wherein the sheet of flexible material comprises a plurality of sheet segments placed together on the first side of the sheet of rigid material to form a planar surface for bearing against the material.

3. The tool of claim 1 wherein the plurality of lines formed on the first side of the sheet of rigid material comprise composite color lines.

4. The tool of claim 1 wherein the sheet of flexible material has lines formed on a first side thereof, and the sheet of flexible material is placed on the sheet of rigid material such that the first side of the sheet of flexible material bears against the first side of the sheet of rigid material.

5. The tool of claim 1 wherein the sheet of flexible material has a plurality of lines formed on a second side, and the sheet of flexible material has a first side placed against a first side of the sheet of rigid material.

6. The tool of claim 1 wherein the sheet of flexible material is adhered to die side of the sheet of rigid material on which the plurality of lines are formed.

7. A tool for use in measuring and marking material, comprising:
   a transparent sheet of rigid material having first and second opposing planar sides and a plurality of lines formed on one of the first and second opposing planar sides; and
   a sheet of non-static cling flexible material formed of a vinyl material having plasticizers that continually migrate to surfaces of the sheet of flexible material, the sheet of flexible material adhering to the first side of the sheet of rigid material by surface adhesion only and configured to cover substantially the entire first side of the sheet of rigid material to provide a planar, non-slip surface and to leave no adhesive on the first side of the sheet of rigid material when removed therefrom.

8. The tool of claim 7 wherein the sheet of flexible material comprises a plurality of sheet segments placed together on the first side of the sheet of rigid material to form a planar surface for bearing against the material.

9. The tool of claim 7 wherein the plurality of lines are formed on the first side of the sheet of rigid material.

10. The tool of claim 7 wherein the sheet of flexible material has lines formed on a first side thereof, and the sheet of flexible material is placed on the sheet of rigid material such that the first side of the sheet of flexible material bears against the first side of the sheet of rigid material.

11. The tool of claim 7 wherein the sheet of flexible material has a plurality of lines formed on a second side, and the sheet of flexible material has a first side placed against a first side of the sheet of rigid material.

12. A method of making a tool for use in measuring and marking material, comprising:
    providing a transparent sheet of rigid material having first and second opposing planar sides and a plurality of lines formed on one of the first and second opposing planar sides;
    providing a transparent sheet of non-static cling, non-slip flexible material;
    placing the sheet of flexible material on one of the first and second opposing planar sides of the sheet of rigid material to cover substantially the entire one of the first and second opposing planar sides of the sheet of rigid material and provide a planar, non-slip surface between the transparent sheet of rigid material and the material to be measured and marked, the sheet of flexible material adhering to the sheet of rigid material by surface adhesion only and to not leave adhesive material on the transparent sheet of rigid material when removed therefrom.

13. The method of claim 12 wherein the sheet of flexible material comprises a plurality of sheet segments placed together on the first side of the sheet of rigid material to form a planar surface for bearing against the material.

14. The method of claim 12 wherein the plurality of lines are formed on the first side of the sheet of rigid material.

15. The method of claim 12 wherein the plurality of lines are formed on the second side of the sheet of rigid material.

16. The method of claim 12 wherein the sheet of flexible material has lines formed on a first side thereof, and the sheet of flexible material is placed on the sheet of rigid material such that the first side of the sheet of flexible material bears against the first side of the sheet of rigid material.

17. The method of claim 12 wherein the sheet of flexible material has a plurality of lines formed on a second side, and the sheet of flexible material has the first side placed against the first side of the sheet of rigid material.

18. A method of making a transparent tool for use with a material to be measured and marked by the tool, the method comprising:
    providing a transparent sheet of flexible material formed of non-static cling vinyl film having plasticizers that continually migrate to a surface of the film;
    placing the sheet of flexible material on one of first and second opposing planar sides of a sheet of rigid material to cover substantially the entire one of the first and second opposing planar sides of the sheet of rigid material and form a planar non-slip surface between the sheet of rigid material and the material to be measured and marked, the sheet of flexible material adhering to the sheet of rigid material by surface adhesion only; and
    removing the sheet of flexible material from the sheet of rigid material without altering the sheet of rigid material and without leaving adhesive on the sheet of rigid material.

\* \* \* \* \*